United States Patent
Liu et al.

(10) Patent No.: US 11,273,556 B2
(45) Date of Patent: Mar. 15, 2022

(54) INTELLIGENT GRIPPER FOR HYDRAULIC TORQUE CONVERTER HAVING AUTOMATIC TOOTH ALIGNMENT

(71) Applicant: ANHUI JEE AUTOMATION EQUIPMENT Co., Ltd, AnHui (CN)

(72) Inventors: Lei Liu, AnHui (CN); Changjun Jin, AnHui (CN); Guochun Li, AnHui (CN); Derui Li, AnHui (CN); Junjie Zhang, AnHui (CN)

(73) Assignee: Jee Technology Co., Ltd., Anhui (CN)

( * ) Notice: Subject to any disclaimer, the term of this patent is extended or adjusted under 35 U.S.C. 154(b) by 325 days.

(21) Appl. No.: 16/492,122

(22) PCT Filed: Dec. 26, 2018

(86) PCT No.: PCT/CN2018/123745
§ 371 (c)(1),
(2) Date: Sep. 7, 2019

(87) PCT Pub. No.: WO2019/205691
PCT Pub. Date: Oct. 31, 2019

(65) Prior Publication Data
US 2021/0323170 A1 Oct. 21, 2021

(30) Foreign Application Priority Data

Apr. 28, 2018 (CN) .......................... 20180404612.5

(51) Int. Cl.
*B25J 13/08* (2006.01)
*B23P 19/10* (2006.01)

(52) U.S. Cl.
CPC ........... *B25J 13/085* (2013.01); *B23P 19/105* (2013.01); *B23P 19/107* (2013.01)

(58) Field of Classification Search
CPC ........ B25J 13/082; B25J 13/086; B25J 11/00; B25J 18/04; B23P 19/107; B23P 19/105
See application file for complete search history.

(56) References Cited

FOREIGN PATENT DOCUMENTS

| CN | 203817732 U | 9/2014 |
| CN | 205129329 U | 4/2015 |

(Continued)

OTHER PUBLICATIONS

Machine translation of CN 203817732 U (Year: 2014).*

*Primary Examiner* — Christopher J Besler
(74) *Attorney, Agent, or Firm* — Craft Chu PLLC; Andrew W. Chu

(57) ABSTRACT

The intelligent gripper for a hydraulic torque converter includes an upper supporting plate. A clamping mechanism, a vibration excitation mechanism and a drive rotating mechanism are arranged on the upper supporting plate. The clamping mechanism is used for automatically clamping a T-shaped cap of a hydraulic torque converter. The vibration excitation mechanism comprises a plurality of vibration excitation cylinders and a plurality of vibration excitation heads. The plurality of vibration excitation heads is driven to be alternately telescopic through alternate actions of the plurality of vibration excitation cylinders, to hit the hydraulic torque converter so as to achieve automatic and precise tooth alignment. The drive rotating mechanism includes at least two shifting blocks and at least two guide shafts.

9 Claims, 6 Drawing Sheets

(56) References Cited

FOREIGN PATENT DOCUMENTS

| | | |
|---|---|---|
| CN | 107234436 A | 10/2017 |
| CN | 108581460 A | 9/2018 |
| DE | 10301237 A1 | 7/2003 |
| JP | 2010253614 A | 11/2010 |

* cited by examiner

INTELLIGENT GRIPPER FOR HYDRAULIC TORQUE CONVERTER HAVING AUTOMATIC TOOTH ALIGNMENT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the technical field of production devices for automobile parts, and more particularly, to an intelligent gripper for a hydraulic torque converter having an automatic tooth alignment function.

2. Description of Related Art Including Information Disclosed Under 37 CFR 1.97 and 37 CFR 1.98

A torque converter is one of the important components in an automotive transmission, and the assembling quality of the torque converter directly affects the overall performances of the transmission. The process of assembling the hydraulic torque converter into a box requires simultaneous alignment of two sets of splines. As shown in FIG. 1, during the assembling process, a first internal spline 20 and a second internal spline 21 of the hydraulic torque converter are engaged with a first external spline 22 and a second external spline 23 of an input shaft of a box body respectively. Therefore, both manual assembling and device assembling are difficult. At present, an automatic tooth alignment method commonly used on automobile assembling lines is to perform assembling with a robot provided with a force sensor. The robot applies a pressure to shake a workpiece, and determines and changes the direction of a force through the force sense. Whether the assembling is in place or not is determined by means of the end displacement of the robot. For the current assembling method of the robot, the success rate is not very high. Moreover, this simultaneous operation of double layers of splines sets new requirements in accordance with the performances and control methods of the current robot. Therefore, the device cost is greatly increased.

BRIEF SUMMARY OF THE INVENTION

An objective of the present invention is to overcome the defects of the prior art, and provide an intelligent gripper for a hydraulic torque converter having an automatic tooth alignment function, in order to assemble a workpiece hydraulic torque converter in place smoothly by means of a vibration excitation function and a drive rotating manner of the intelligent gripper.

The present invention is implemented by the following technical solution.

There is provided an intelligent gripper for a hydraulic torque converter having an automatic tooth alignment function, wherein the hydraulic torque converter comprises a disc-shaped body; a T-shaped cap is arranged in the center of the upper end surface of the disc-shaped body; a plurality of bosses is uniformly distributed on the upper end surface of the disc-shaped body in a circumferential direction; the intelligent gripper is used for assembling the hydraulic torque converter and a box body; the intelligent gripper comprises an upper supporting plate, and a clamping mechanism, a vibration excitation mechanism and a drive rotating mechanism are arranged on the upper supporting plate;

the clamping mechanism is arranged in the center of the bottom end surface of the upper supporting plate and stretches downwards; the clamping mechanism is used for automatically clamping the T-shaped cap of the hydraulic torque converter;

the vibration excitation mechanism comprises a plurality of vibration excitation cylinders and a plurality of vibration excitation heads, wherein the plurality of vibration excitation cylinders is uniformly distributed in a circumferential direction of the upper supporting plate; a piston rod of each vibration excitation cylinder stretches downwards vertically and is connected with the corresponding vibration excitation head; the plurality of vibration excitation heads is driven to be alternately telescopic through alternate actions of the plurality of vibration excitation cylinders, to alternately hit the disc-shaped body of the hydraulic torque converter below so as to achieve automatic and precise tooth alignment of an internal spline of the hydraulic torque converter and an external spline of the box body;

the drive rotating mechanism comprises at least two shifting blocks and at least two guide shafts, wherein the upper end of each guide shaft stretches upwards out of the upper supporting plate and is provided with a shaft end check block; the lower end of each guide shaft stretches downwards vertically and is connected with the corresponding shifting block; the lower end of each guide shaft and the corresponding shifting block are in floating connection to form a spherical pair; the bottom end of each shifting block is provided with a check ring sleeving the corresponding boss of the hydraulic torque converter; each of the guide shafts is sleeved with a spring adjustment ring; the lower section of each of the guide shafts is further sleeved with a compression spring; the upper end and the lower end of the compression spring are pressed between the corresponding spring adjustment ring and the corresponding shifting block respectively; and during work, the check rings of the shifting blocks sleeve the bosses of the hydraulic torque converter, and the intelligent gripper rotates to drive the hydraulic torque converter to rotate together.

Further, the clamping mechanism comprises a clamping claw cylinder which is mounted at the bottom end of the upper supporting plate; the lower end of the clamping claw cylinder is provided with three clamping claws; the three clamping claws are driven by the clamping claw cylinder to automatically stretch out or to be automatically closed; and the T-shaped cap of the hydraulic torque converter is clamped by the three clamping claws when the three clamping claws are closed.

Further, the upper section of each of the guide shafts is sleeved with a linear bearing for providing vertical guidance for the guide shaft; and the linear bearing is mounted on the upper supporting plate.

Further, two laser displacement sensors, which are used for measuring a distance of the hydraulic torque converter relative to the upper supporting plate, are further arranged on the bottom of the upper supporting plate.

Further, the top end of the upper supporting plate is provided with a mounting flange and is connected with an external device by means of the mounting flange.

Further, the lower end of each of the vibration excitation heads is a flexible end.

Further, a hook block for hooking the T-shaped cap of the hydraulic torque converter is arranged on the inner side of each of the clamping claws.

Further, an arc-shaped groove is formed in the outer side of each of the three clamping claws, and an enclosed tension spring is arranged in the arc-shaped groove of each of the three clamping claws in a sleeving manner.

Further, each shifting block comprises a shifting block body and a shifting block cover plate covering the top of the shifting block body; and the shifting block cover plate is detachably connected with the corresponding shifting block body.

Compared with the prior art, the present invention has the following advantages.

1. According to the intelligent gripper for the hydraulic torque converter having the automatic tooth alignment function as provided by the present invention, the hydraulic torque converter can realize automatic gripping and automatic tooth alignment when being assembled into a box by means of a relatively simple structure design. With respect to the method of assembling the hydraulic torque converter into the box, the vibration excitation mechanism is used to simulate the way of manually shaking the hydraulic torque converter. The plurality of vibration excitation cylinders is alternately telescopic to drive the plurality of vibration excitation heads to be alternately telescopic, so as to alternately hit the disc-shaped body of the hydraulic torque converter below, thereby realizing automatic and precise tooth alignment of an internal spline of the hydraulic torque converter and an external spline of the box body. Therefore, the success rate of tooth alignment is greatly increased. Compared with the existing tooth alignment scheme, the device input cost is greatly reduced, and a new simple and effective idea is provided for the tooth alignment assembling in the future.

2. The intelligent gripper for the hydraulic torque converter having the automatic tooth alignment function as provided by the present invention can drive the hydraulic torque converter to rotate together while rotating, by means of the design of the drive rotating mechanism and in conjunction with the clamping mechanism. In addition, since each guide shaft and the corresponding shifting block are in floating connection to form the spherical pair and the hydraulic torque converter may shake and incline randomly in the tooth alignment process, the corresponding shifting block may move accordingly. The two sets of shifting blocks ensure that the intelligent gripper drives the hydraulic torque converter to rotate in the tooth alignment process.

In drawings, the respective reference symbols represent the following components: 1—mounting flange; 2—upper supporting plate; 3—vibration excitation cylinder; 4—cylinder mounting support; 5—vibration excitation head; 6—laser displacement sensor support; 7—laser displacement sensor; 8—shaft end check block; 9—guide shaft; 10—linear bearing; 11—spring adjustment ring; 12—compression spring; 13—shifting block cover plate; 14—shifting block body; 15—clamping claw; 151—hook block; 152—arc-shaped groove; 16—clamping claw cylinder; 17—tension spring; 18—hydraulic torque converter; 181—disc-shaped body; 182—T-shaped cap; 183—boss; 19—box body; 20—first internal spline; 21—second internal spline; 22—first external spline; and 23—second external spline.

DETAILED DESCRIPTION OF THE INVENTION

The embodiment of the present invention is described in detail below. This embodiment is implemented on the premise of the technical solution of the present invention. A detailed implementation manner and a specific operation procedure are given, but the protection scope of the present invention is not limited to the following embodiment.

Figure 1:
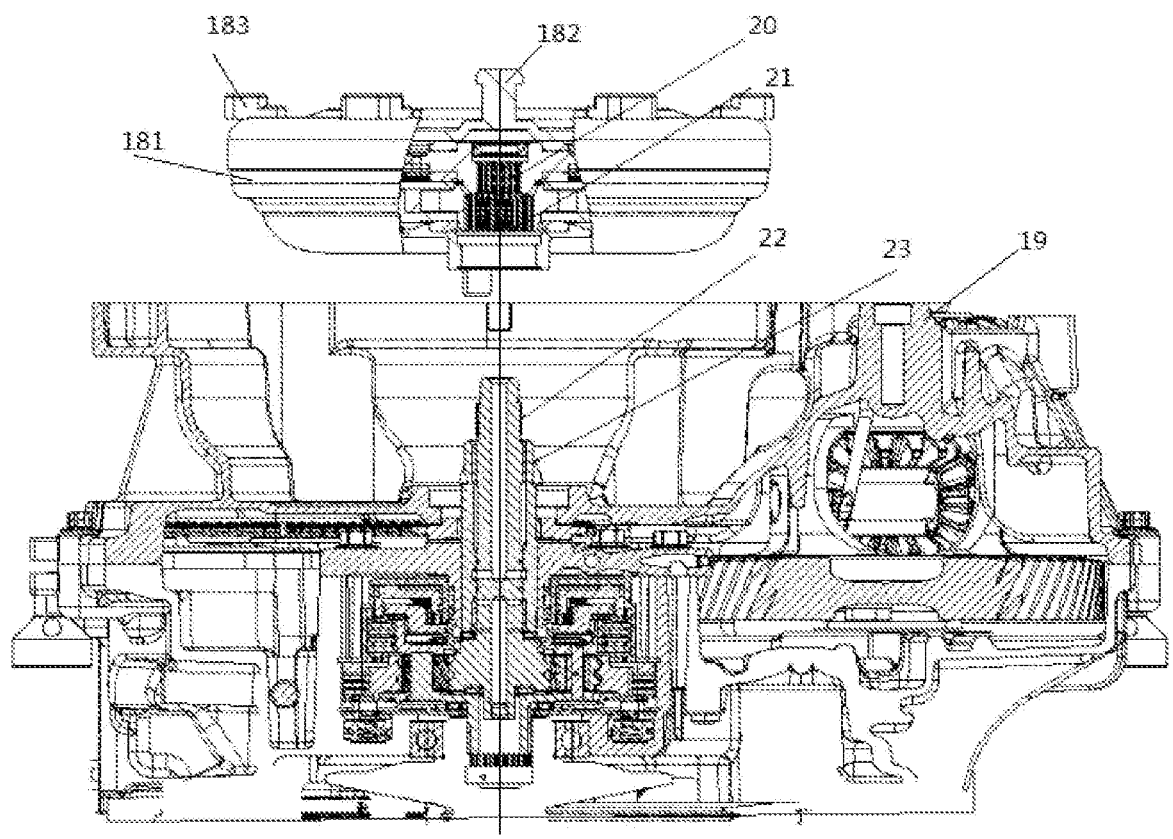
FIG. 1 is a schematic sectional view of a diagram during assembling of a hydraulic torque converter and a box body according to the present invention.
Figure 2:
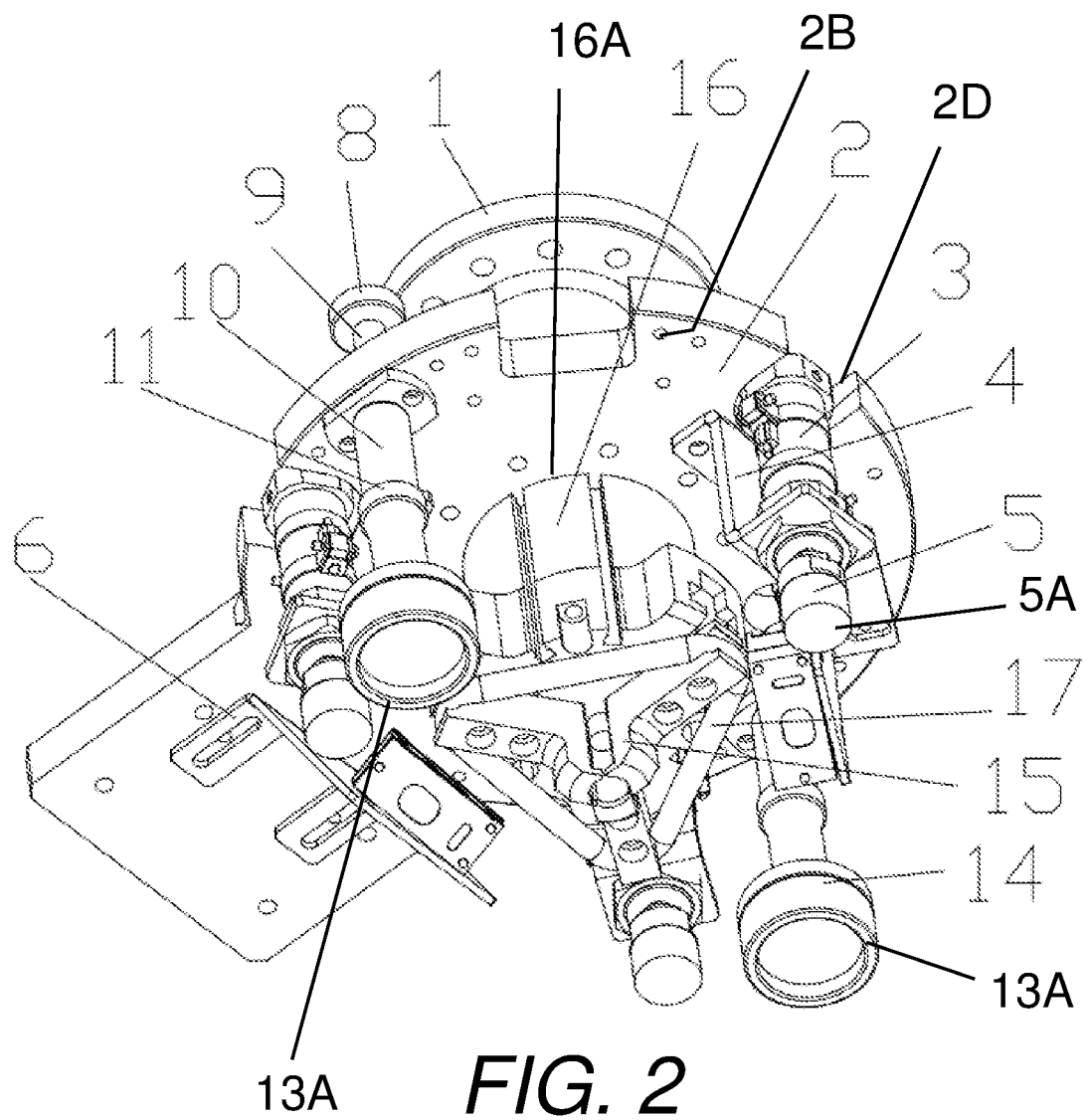
FIG. 2 is a schematic perspective view of a structural stereogram of the present invention.
Figure 3:
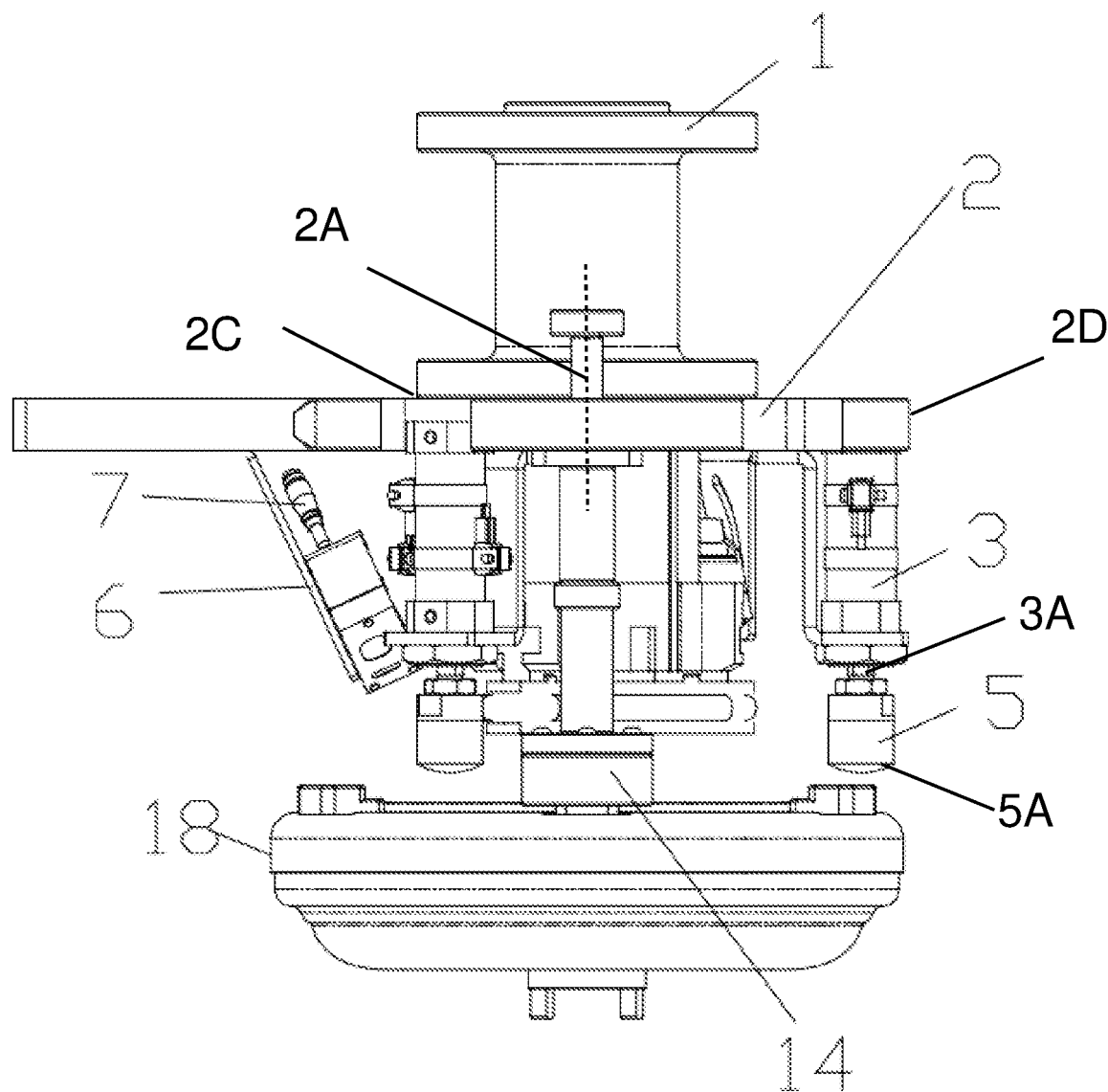
FIG. 3 is a main elevation view of the present invention.
Figure 4:
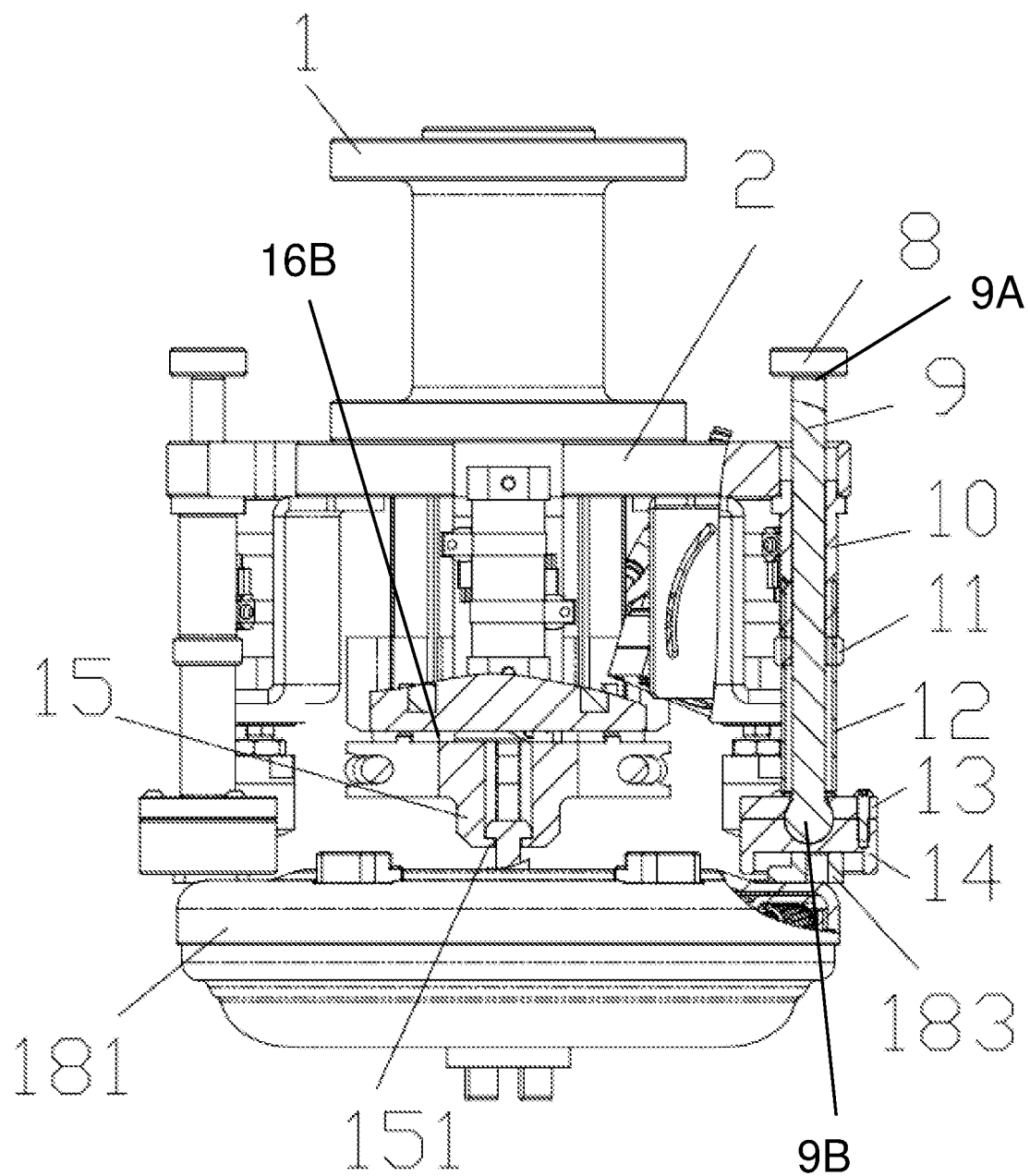
FIG. 4 is a partial longitudinal sectional view of the present invention.
Figure 5:
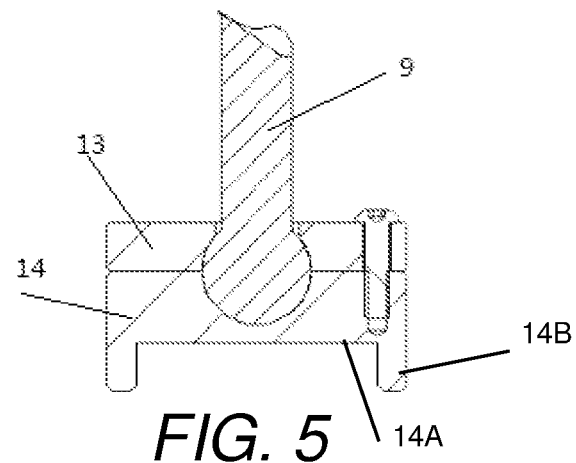
FIG. 5 is a state diagram when a shifting block is in a normal gesture according to the present invention.
Figure 6:
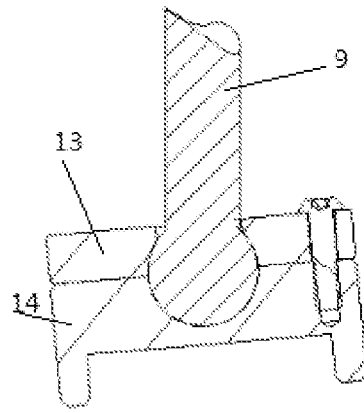
FIG. 6 is a schematic view of a state diagram when the shifting block is in an inclined gesture in the tooth alignment process according to the present invention.
Figure 7:
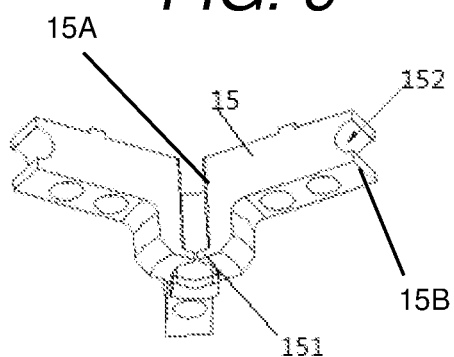
FIG. 7 is a schematic view of a diagram showing individual structures of three clamping claws according to the present invention.
Figure 8:
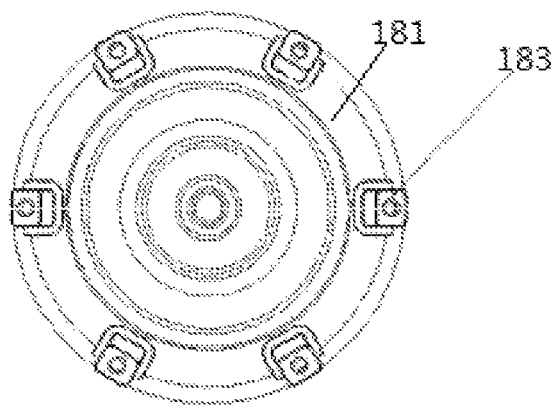
FIG. 8 is a top schematic view of the hydraulic torque converter according to the present invention.

Referring to FIGS. 2 to 8, this embodiment discloses an intelligent gripper for a hydraulic torque converter having an automatic tooth alignment function. The hydraulic torque converter 18 comprises a disc-shaped body 181. A T-shaped cap 182 is arranged in the center of the upper end surface of the disc-shaped body 181. A plurality of bosses 183 is uniformly distributed on the upper end surface of the disc-shaped body 181 in a circumferential direction. The intelligent gripper is used for assembling the hydraulic torque converter 18 and a box body 19.

The intelligent gripper comprises an upper supporting plate 2 (having a plate center 2A, a plate bottom end surface 2B, a plate top end surface 2C opposite the plate bottom end surface, and a plate circumference 2D around the plate center). A clamping means or mechanism, a vibration excitation means or mechanism and a drive rotating means or mechanism are arranged on the upper supporting plate 2. The top end (plate top end surface 2C) of the upper supporting plate 2 is provided with a mounting flange 1 and is connected with an external device by means of the mounting flange 1.

The clamping means or mechanism is arranged in the plate center 2A of the bottom end surface (plate bottom end surface 2B) of the upper supporting plate 2 and stretches downwards. The clamping means or mechanism is used for automatically clamping the T-shaped cap 182 of the hydraulic torque converter 18. The clamping means or mechanism comprises a clamping claw cylinder 16 (having an upper claw cylinder end 16A and lower claw cylinder end 16B opposite the upper claw cylinder end) which is arranged at the bottom end (plate bottom end surface 2B) of the upper supporting plate 2. The lower end (lower claw cylinder end 16B) of the clamping claw cylinder 16 is provided with three clamping claws 15 (each claw 15 having an inner claw side 15A and an outer claw side 15B opposite the inner claw side). The three clamping claws 15 are driven by the clamping claw cylinder 16 to automatically stretch out or to be automatically closed. A hook block 151 for hooking the T-shaped cap 182 of the hydraulic torque converter 18 is arranged on the inner side (inner claw side 15A) of each of the clamping claws 15. An arc-shaped groove 152 is formed in the outer side (outer claw side 15B) of each of the three clamping claws 15, and an enclosed tension spring 17 is arranged in the arc-shaped groove 152 of each of the three clamping claws 15 in a sleeving manner, to prevent the three clamping claws 5 from realizing a certain self-locking function in cases of gas supply failure and power failure of the clamping claw cylinder 16. The three clamping claws 15 clamp the T-shaped cap 182 of the hydraulic torque converter 18 when the three clamping claws 15 are closed, to provide an uplift clamping force for the T-shaped cap 182.

The vibration excitation means or mechanism comprises a plurality of vibration excitation cylinders 3 and a plurality of vibration excitation heads 5. The plurality of vibration excitation cylinders 3 is uniformly distributed in a circumferential direction of the upper supporting plate 2, and is mounted on the upper supporting plate 2 by means of a cylinder mounting support 4. A piston rod 3A of each vibration excitation cylinder 3 extends downwards vertically and is connected with the corresponding vibration excitation head 5. The lower end of each vibration excitation head 5 is a flexible end (flexible lower head end 5A). The flexible end is configured to effectively reduce the noise and the damage to a workpiece in a contact compression process of the vibration excitation heads 5 with the hydraulic torque converter 18 and in the vibration excitation process of the vibration excitation heads 5. The plurality of vibration excitation heads 5 is driven to be alternately telescopic by means of the alterative actions of the plurality of vibration excitation cylinders 3, so as to alternately hit the disc-shaped body 181 of the hydraulic torque converter 18 below, thereby realizing automatic and precise tooth alignment of an internal spline of the hydraulic torque converter 18 and an external spline of the box body 19. The arranged vibration excitation mechanism has two main functions. 1. During the gripping and conveying process of the workpiece hydraulic torque converter 18, a plurality of vibration excitation cylinders 3 simultaneously stretches to press the workpiece downward, and cooperate with the clamping mechanism to realize axial positioning and clamping of the workpiece. 2. During the process of tooth alignment by assembling the workpiece hydraulic torque converter 18 into the box, the plurality of vibration excitation cylinders 3 is alternately telescope to drive the plurality of excitation heads 5 to be alternately telescopic to improve the success rate of tooth alignment.

The drive rotating means or mechanism comprises at least two or a plurality of shifting blocks 13A and at least two guide shafts 9 (each guide shaft having an upper shaft end 9A and a lower shaft end 9B opposite the upper shaft end). The upper end (upper shaft end 9A) of each guide shaft 9 stretches upwards out of the upper supporting plate 2 and is provided with a shaft end check block 8. The lower end (lower shaft end 9B) of each guide shaft 9 extends downwards vertically and is connected with the corresponding shifting block. The upper section (upper shaft end 9A) of each of the guide shafts 9 is sleeved with a linear bearing 10 for providing vertical guidance for the guide shaft 9. The linear bearing 10 is mounted on the upper supporting plate 2. The lower end (lower shaft end 9B) of each guide shaft 9 and the corresponding shifting block are in floating connection to form a spherical pair (a rotatable spherical socket engagement). Each shifting block comprises a shifting block body 14 and a shifting block cover plate 13 covering the top of the shifting block body 14. The shifting block cover plate 13 is detachably connected with the shifting block body 14. The bottom end (block bottom end 14A) of each shifting block is provided with a check ring 14B sleeving the corresponding boss 183 of the hydraulic torque converter 18. Each of the guide shafts 9 is sleeved with a spring adjustment ring 11. The lower section of each of the guide shafts 9 is further sleeved with a compression spring 12. The upper end and the lower end of the compression spring 12 are pressed between the corresponding spring adjustment ring 11 and the corresponding shifting block respectively. During work, the check rings of the shifting blocks sleeve the bosses 183 of the hydraulic torque converter 18. The intelligent gripper rotates to drive the hydraulic torque converter 18 to rotate together. There are two functions for arranging the spring adjustment ring 11. 1. The end surface of the linear bearing 10 is prevented from being damaged by the spring force of the compression spring 12. 2. The compression amount of the compression spring 12 is adjusted by adjusting the thickness of the spring adjustment ring 11. The compression spring 12 is normally in a compressed state, and has a function of making the corresponding shifting block in a horizontal state, which is convenient for the intelligent gripper to be docked and clamped with the hydraulic torque converter 18 before gripping. Each guide shaft 9 and the corresponding shifting block are in floating connection to perform the spherical pair. The shifting block is normally in a horizontal state under the elasticity of the compression spring 12. Since the workpiece may shake and incline randomly in the tooth alignment assembling process, the corresponding shifting block may move accordingly. The two sets of shifting blocks ensure that the intelligent gripper drives the hydraulic torque converter 18 to rotate in the tooth alignment process.

Two laser displacement sensors 7, which are used for measuring a distance of the hydraulic torque converter 18 relative to the upper supporting plate 2, are further arranged on the bottom of the upper supporting plate 2. The laser displacement sensors 7 are mounted on the upper supporting plate 2 through a laser displacement sensor support 6. The mounting gesture of the two laser displacement sensors 7 is adjustable such that two measuring points are centrally symmetrical with respect to the hydraulic torque converter 18; and the two laser displacement sensors 7 have a function of determining whether a workpiece is assembled in place by measuring the distance of the workpiece hydraulic torque converter 18 relative to the upper supporting plate 2.

The working process of the intelligent gripper provided by this embodiment is as follows.

During work, the upper end surface of the mounting flange 1 of the intelligent gripper is connected to an external transplanting device which may be a robot. Firstly, the three clamping claws 15 are driven by the clamping claw cylinders 16 to stretch to clamp the T-shaped cap 182 of the hydraulic torque converter 18. The plurality of vibration excitation heads 5 stretches and is pressed against the upper end surface of the hydraulic torque converter 18, thereby clamping the hydraulic torque converter 18. In this case, the check ring of each shifting block just sleeves the corresponding boss 183. Then, the transplanting device drives the intelligent gripper and the hydraulic torque converter 18 together to a position above a box body 19 to be assembled. When the hydraulic torque converter 18 is moved downward to be in contact with the external spline in the box body 19, the three clamping claws 15 are released. Then, the plurality of vibration excitation cylinders 3 is alternately telescopic to drive the plurality of vibration excitation heads 5 to be telescopic alternately. The plurality of vibration excitation heads 5 alternately hits the disc-shaped body 181 of the hydraulic torque converter 18 below so as to achieve automatic and precise tooth alignment of an internal spline of the hydraulic torque converter 18 and an external spline of the box body 19. Therefore, the success rate of tooth alignment is greatly increased. During the tooth alignment process, due to the presence of a drive rotating mechanism, the hydraulic torque converter 18 can be driven to rotate together while the intelligent gripper rotates. Since each guide shaft 9 and the corresponding shifting block are in floating connection to form a spherical pair and the hydraulic torque converter 18 may shake and incline randomly in the tooth alignment process, the corresponding shifting block may move accordingly. The two sets of shifting blocks ensure that the intelligent gripper drives the hydraulic torque converter 18 to move accordingly in the tooth alignment process, so that the hydraulic torque converter 18 can realize automatic gripping and automatic tooth alignment when being assembled into the box.

The foregoing descriptions are only preferred embodiments of the present invention, and do not intend to limit the present invention. Any variation, equivalent substitution and modification that fall within the spirit and principle of the present invention should be embraced by the protective scope of the present invention.

We claim:

1. An intelligent gripper for a hydraulic torque converter having an automatic tooth alignment function, comprising:
   an upper supporting plate having a plate center, a plate bottom end surface, a plate top end surface opposite said plate bottom end surface, and a plate circumference around said plate center;
   a clamping means being arranged in said plate center of said upper supporting plate and stretched downwards from said plate bottom end surface so as to be configured to clamp a T-shaped cap of the hydraulic torque converter;
   a vibration excitation means being comprised of:
      a plurality of vibration excitation cylinders, each cylinder having a piston rod; and
      a plurality of vibration excitation heads, each of the vibration excitation heads having a corresponding one of the vibration excitation cylinders,
   wherein said plurality of vibration excitation cylinders are uniformly distributed around said plate circumference of said upper supporting plate, and
   wherein each of the piston rods stretch downward vertically and is connected to a respective one of the vibration excitation heads, said plurality of vibration excitation heads being alternately telescopically driven through alternate actions of said plurality of vibration excitation cylinders so as to be configured to alternately hit a disc-shaped body of the hydraulic torque converter into achieving tooth alignment of an internal spline of the hydraulic torque converter and an external spline of a box body; and
   a drive rotating means being comprised of:
      a plurality of shifting blocks;
      a plurality of guide shafts;
      a plurality of spring adjustment rings; and
      a plurality of compression springs, each of the guide shafts having a corresponding one of the shifting blocks, a corresponding one of the spring adjustment rings, and a corresponding one of the compression springs,
      wherein each of the guide shafts have an upper shaft end and a lower shaft end opposite said upper shaft end, said upper shaft end stretching upwards above said upper supporting plate, said lower shaft end extending downwards vertically, said corresponding compression spring being sleeved around said lower shaft end between said corresponding spring adjustment ring and said corresponding shifting block,
   wherein each of the upper shaft ends is comprised of a shaft end check block,
   wherein each of the lower shaft ends is connected with a respective shifting block in a rotatable spherical socket engagement, and
   wherein each of the shifting blocks have a block bottom end and is comprised of a check ring at said block bottom end so as to be configured to sleeve a corresponding boss of the hydraulic torque converter and rotate together during work.

2. The intelligent gripper for the hydraulic torque converter having the automatic tooth alignment function according to claim 1, wherein said clamping means is comprised of: a clamping claw cylinder having an upper claw cylinder end and lower claw cylinder end opposite said upper claw cylinder end and being mounted at said plate bottom end surface; and
   three clamping claws at said lower claw cylinder end so as to be configured to be driven by said clamping claw cylinder to automatically stretch out or to be automatically closed with the T-shaped cap of the hydraulic torque converter being clamped by said three clamping claws when closed.

3. The intelligent gripper for the hydraulic torque converter having the automatic tooth alignment function according to claim 1, further comprising:
   a plurality of linear bearings, each upper shaft end being sleeved with a corresponding linear bearing, each linear bearing being mounted on said upper supporting plate.

4. The intelligent gripper for the hydraulic torque converter having the automatic tooth alignment function according to claim 1, further comprising:
   two laser displacement sensors arranged on said plate bottom end surface so as to be configured to measure a distance of the hydraulic torque converter relative to the upper supporting plate.

5. The intelligent gripper for the hydraulic torque converter having the automatic tooth alignment function according to claim 1, further comprising:
a mounting flange on said plate top end surface so as to be configured to connect with an external device.

6. The intelligent gripper for the hydraulic torque converter having the automatic tooth alignment function according to claim 1, wherein each of the vibration excitation heads have a flexible lower head end.

7. The intelligent gripper for the hydraulic torque converter having the automatic tooth alignment function according to claim 2, wherein each of the clamping claws have an inner claw side and an outer claw side opposite said inner claw side are comprised of a hook block on said inner claw side so as to be configured to hook the T-shaped cap of the hydraulic torque converter.

8. The intelligent gripper for the hydraulic torque converter having the automatic tooth alignment function according to claim 2, wherein each of the clamping claws have an inner claw side and an outer claw side opposite said inner claw side and is comprised of an arc-shaped groove in said outer claw side and an enclosed tension spring arranged in said arc-shaped groove, said enclosed tension spring being sleeved in said arc-shaped groove.

9. The intelligent gripper for the hydraulic torque converter having the automatic tooth alignment function according to claim 1, wherein each of the shifting blocks comprise a shifting block body and a shifting block cover plate covering said shifting block body and being detachably connected to said shifting block body.

* * * * *